May 26, 1942.  W. B. ELMER  2,284,383
THERMOSTATIC CONTROL DEVICE
Filed Jan. 12, 1939  2 Sheets—Sheet 2
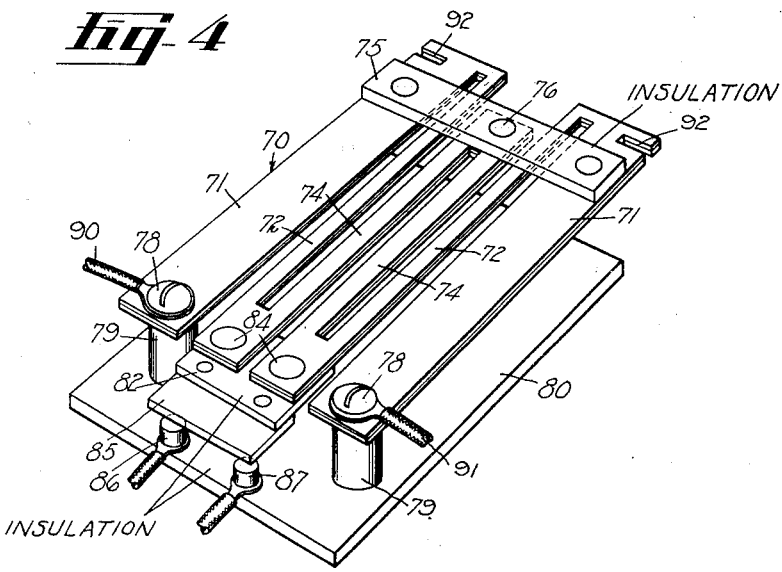
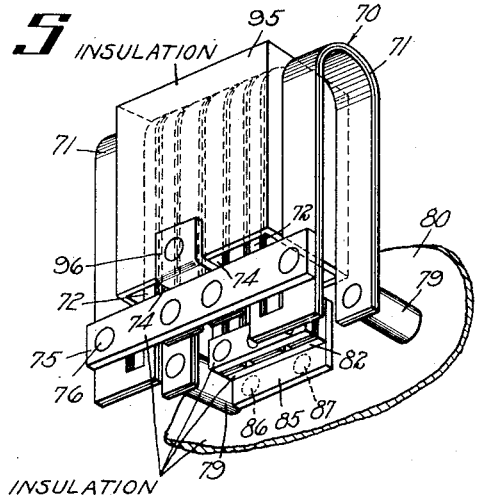
Inventor
WILLIAM B. ELMER
By W. Clay Lindsey
Attorney Patented May 26, 1942

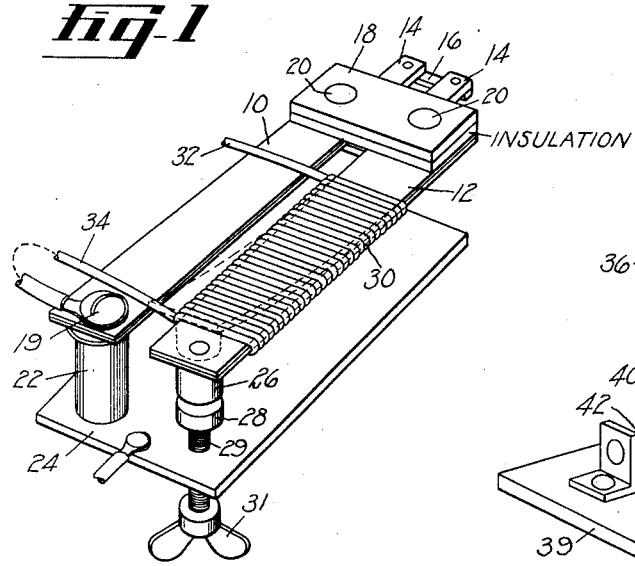
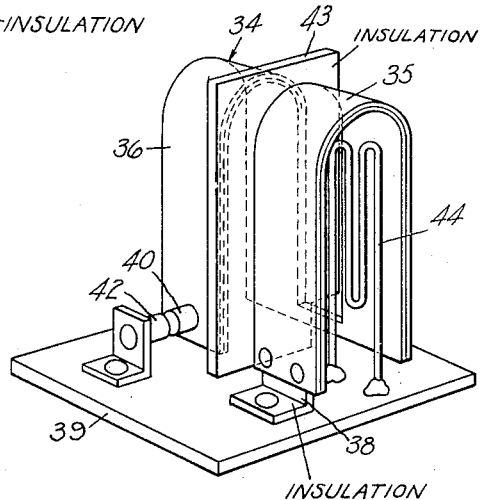
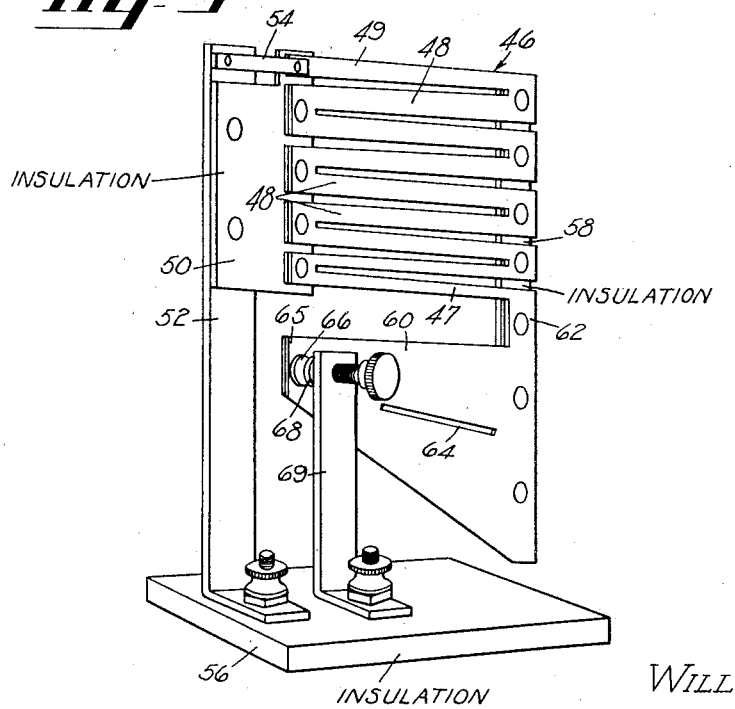

2,284,383

UNITED STATES PATENT OFFICE 2,284,383

THERMOSTATIC CONTROL DEVICE

William B. Elmer, Winchester, Mass.

Application January 12, 1939, Serial No. 250,563

19 Claims. (Cl. 200—113)

The present invention relates to thermostatic devices and more particularly to thermostatic motor elements used for electrical control purposes.

In the construction of thermostatic control and relay devices, it is frequently necessary to compensate the action thereof for variations in ambient temperatures. This has been done by providing two equal thermostatic elements placed in various mutually opposing relationships so that the variations in ambient temperature produce no resultant motion in the devices; or the two thermostatic members have been mounted in a way so as to operate in unison with both elements moving equally in response to ambient temperature variations, whereupon the movable ends have no relative motion except in response to differential heating of the two members.

The present invention aims to provide an improved thermostatic motor element which comprises two thermostatic structures of similar action so joined as to provide an ambient compensated thermostatic element having a free end movable only in response to artificial heating of one of the thermostatic structures or to a differential heating of the two elements.

A further object is to provide an improved compensating thermostatic motor element in which the compensating action for variations in ambient temperature does not produce abnormal stresses in the thermostatic material.

A still further object is the provision of a thermostatic motor element of a single piece of metal in the form of a grid resistor in which a minimum of differential stresses exist between the various parts thereof.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings:

Figure 1 shows a perspective view of a thermostatic element embodying the invention herein;

Fig. 2 shows another embodiment of the invention wherein there is included a separate heating element for the thermostatic element;

Fig. 3 is a perspective view of another thermostatic element embodying the invention herein and wherein the element is made of a single piece of thermostatic material;

Fig. 4 is a perspective view of a thermostatic element made of a single piece of material and mounted in horizontal position; and Fig. 5 shows an embodiment similar to Fig. 4 wherein the thermostatic element has been given a U shape.

Referring to the drawings, and more particularly to Fig. 1, there is shown two spaced apart, parallel, composite metal members 10 and 12, each of which is provided with an extension 14 electrically joined together by a cross member or jumper 16, which jumper is secured by welding, riveting, or any other suitable means. Members 10 and 12 lie in the same cylindrical surface or space curve. The outer ends of the members 10 and 12 adjacent the extensions 14 are secured together by a strap 18 of suitable insulating material and secured to the members in any suitable way, such as by rivets 20. The inner end of the member 10 is secured by a screw 19 to, but insulated from, a supporting post 22 which extends vertically from any suitable supporting base 24. The inner end of the other member 12 is free to move and carries thereon a contact 26 adapted to be moved into and out of engagement with a contact 28 upon movement of the member 12. The contact 28 is carried on the upper end of a screw 29 threadably mounted in the base 24 and adapted to be adjusted by means of the wing nut 31. The member 12 has wound thereon an electric resistance heating coil 30 through which current may flow to change the temperature of the member 12. The heating coil shown is connected in series with the contacts 26 and 28; one lead 32 thereof being connected to a source of power and the other lead 34 connecting to the inner end of member 10 by the supporting screw 19, whereupon the current will flow from the coil 30 to the member 10, then across jumper 16 to the member 12, and then to the contacts 26, 28.

With this construction, the members 10 and 12 will respond equally to variations in ambient temperature and cause the outer secured ends of the members to deflect upwardly or downwardly without changing the position of the inner end of the member 12 and contact 26 and thereby retaining members 10 and 12 in the same cylindrical space curve. However, when electric current is passed through heating coil 30, the member 12 will become heated, whereas the member 10 will remain cool, whereupon the heated member 12 will deflect into a new position, such as shown by the dotted lines, thereby positioning members 10 and 12 in different space curves. If the adjusting screw 29 for the contact 28 was originally adjusted until the contacts 26 and 28 were in engagement, then the deflection indicated will open the contact, whereupon the current will cease to flow through the coil and the member 12 will cool off to again close the contacts and repeat the cycle.

With this construction, it will be seen that upon changes in the ambient temperature, the members 10 and 12 will be simultaneously affected to the same degree and the outer commonly secured ends thereof will deflect upwardly or downwardly without affecting the relative positions of the inner ends, and thus the position of the contact 26 will remain constant. However, upon differential heating of the members by passing current through the coil 30, the member 12 will deflect in one direction or the other upon the heating or cooling of same independently of the member 10, and thus make or break the contacts 26 and 28. Inasmuch as the relative positions of the contacts 26 and 28 are not changed by changes in ambient temperature, the adjustable contact 28 can be repositioned while the device is in operation without interfering with its operation. Moreover, as the two thermostatic members are not in opposition and not mutually secured together at both ends, there are no internal strains imposed therein as the temperature differential varies. It will also be obvious that the moment of inertia, and hence the susceptibility to vibration, is made small by this construction.

In the embodiment illustrated in Fig. 2 there is provided a thermostatic strip 34 which is made from a single piece of composite thermostatic metal having a longitudinally extending slit therein to provide spaced apart members 35 and 36, which members are bent into a substantially U-shape. The members 35 and 36, as is the case with the corresponding members 10 and 12 shown in Fig. 1, lie in the same cylindrical space curve. The inner leg of member 35 is rigidly secured by a bracket 38 of suitable insulating material to the base 39, whereas the inner leg of the member 36 carries thereon a contact 40 adapted to be moved into and out of engagement with a contact 42 rigidly carried on the base 39. In order to prevent heat transfer from one leg to the other, there may be placed intermediate of the legs a suitable barrier 43 of insulating material. As in the embodiments illustrated in Fig. 1, the outer ends of the legs are rigidly joined together, and the device responds in like manner to changes in ambient temperature. However, instead of passing current through a wire wound upon one leg of the thermostatic element, there is provided an independent heater comprising a wire 44 bent generally in the form of a U and supported by the base 39 within the bent legs of the member 35. In this position, the heat is radiated from the wire 44 to the inner surface of the legs, thereby producing an extremely sensitive and efficient device. The barrier 43 also prevents the radiation of heat from the heating wire 44 to the legs of the other member.

It will be noted that the moment of inertia of the thermo-responsive system of Fig. 2 about its support is even less than in the case of Fig. 1, which provides a device whose parts are especially free from oscillations due to external motion or vibrations.

The embodiment shown in Fig. 3 illustrates a motor element which comprises a plate or piece of thermostatic composite material provided at its upper portion with alternate slits extending crosswise from each end thereof and terminating short of the other end to provide a grid 46 having a series of connected strips through which the current must travel. The slits are positioned to provide strips of varying width. Preferably the lowermost strip 47 is the narrowest and the intermediate strips 48 above it are graduated in increasing width. The uppermost strip 49 is narrower than the strip 48 beneath it.

At the left side edge of the grid the ends of the strips 47, 48 and 49 are integrally joined by a suitable vertical strap 50 of insulating material which, in turn, is secured to an upright post 52 electrically connected to the uppermost strip 49 by a connecting strip 54. The post 52 is mounted on a base 56 and is adapted to hold the grid in vertical position. The ends of the strip at the right side edge of the plate are also integrally joined together by a vertical strap 58 of insulating material and are adapted to deflect simultaneously with respect to their mounted ends.

The lower portion 60 of the plate is spaced downwardly from the lowermost strip 47 of the grid and is connected thereto by a suitable connecting portion 62. The lower portion of the plate has its right side edge secured to the strap 58 and is recessed longitudinally at 64 to minimize strains and facilitate deflection of the free end 65 thereof. The free end is provided with a suitable contact point 66 adapted to engage an adjustable contact pin or screw 68 mounted on an upright post 69. The posts 52 and 69 are adapted to be connected to a suitable source of electrical power so that the current will flow from the post 52 through the grid portion 46 of the plate, to the lower portion of the plate by way of the connecting portion 62 and then to the other post 69 carrying the contact screw 68 engaged by the free end 65 of the lower plate portion. Both grid 46 and lower portion 60 of the plate normally lie in the same cylindrical space curve.

With this construction the upper and lower portions of the plate will respond accurately to variations in ambient temperatures and cause the free ends thereof to deflect forwardly and rearwardly without changing the position of the contact point 66 of the lower plate portion with respect to the contact screw. However, when the grid 46 is heated for a predetermined period by passing current through it, it deflects into a position lying in a different space curve from the one in which the lower portion of the plate lies and thereby moves the contact point 66 out of engagement with the contact screw 68 to open the circuit. Upon cooling of the grid it is adapted to deflect into a position to cause the contact point and the contact screw to engage again and close the circuit.

The strips of the grid have a resistance to electrical current which is inversely proportional to their width whereby the lower or relatively thinner strips create a greater amount of heat. This increased heat is carried upwardly by the natural updraft of surrounding air and serves to heat the upper strips to the same temperature as the lower strips. As a result the grid is heated uniformly from top to bottom to prevent any warping or uneven deflection thereof. The uppermost strip 49 by being thinner than the strip beneath it, creates additional heat to compensate for heat losses caused by the upper edge of the grid being exposed to the surrounding atmosphere. The compensating or lower portion of the plate, by having a relatively large cross sectional area, will not offer material resistance to the passage of electrical current and as a result will not be heated.

Referring to the embodiment shown in Fig. 4, the motor element comprises a single plate or piece of thermostatic composite metal provided with alternate slits extending from each end thereof and terminating short of the other end to provide a grid 70 having relative wide edge strips or members 71, intermediate strips 72, and inner strips 74 to provide a continuous path through which the current must travel. As in the previous embodiment, the outer ends of the strips are integrally joined together for simultaneous movement by a strap 75 of suitable insulating material, secured thereon by the rivets 76.

The inner ends of the outer edge members 71 are secured by suitable screws 78 to, but insulated from, supporting posts 79 extending from any suitable base 80. The inner ends of the intermediate and inner strips 72 and 74 are joined together for simultaneous movement by a strap 82 of suitable insulating material secured thereon by rivets 84. Extending from the strap 82 is a contact plate 85 adapted to span the contacts 86 and 87.

With the grid member made in the form shown, the resistance of the strips is in inverse relation to their width. With this arrangement, if current is passed through the grid member from lead 90 to lead 91, inasmuch as the edge strips 71 offer less resistance to the flow of current than the intermediate and inner strips, they will heat less rapidly. However, as the outer ends of all the strips are joined together, the intermediate and inner strips 72 and 74 will, upon becoming heated, cause the inner ends thereof to deflect and cause the plate 85 to make and break the circuit across the contacts 86 and 87. However, as all of the edge strips will have a like deflection upon changes of ambient temperature, the outer ends of all the strips will be moved simultaneously upon such deflection and the contact plate 85 will be maintained in relatively fixed position to the contacts 86 and 87.

As there is a tendency for the intermediate strips 72 to cool more rapidly than the inner strips 74, they are made somewhat narrower than the inner strips, thus increasing their electrical resistance to produce slightly more heat therein. In this way, the more rapid heat loss is compensated for and all the strips are maintained at a uniform temperature, resulting in equal thermostatic action in all the strips of the heated element and avoiding differences of stresses therein, thus fully utilizing the thermostatic action of the metals. The outer ends of the edge strips 71 may also be provided with transversely extending slots 92 to prevent excessive heat flow from the intermediate strips through the joined ends thereof to the edge strips.

The embodiment illustrated in Fig. 5 is similar to that in Fig. 4, and is similarly numbered. However, the grid element has been built into the form of a U with the high expansive side of the thermostatic metals to the interior. This construction, like the one shown in Fig. 2, is advantageous in that the device is more compact and less heat is required inasmuch as the inner surfaces radiate against one another, whereupon the movement of the contact supporting plate will be more nearly in linear relation to the current passed through the heated circuit. This latter effect is due to the fact that as the ends of the U separate under the application of heat their mutual heating action is lessened. With the element formed in the shape of a U, there may also be provided a heat insulation barrier 95 interposed between the edge strips and the intermediate strips and supported by a bracket 96 carried by a strap 82, thus deflecting the heat losses from the intermediate and inner strips away from the edge strips.

While the compensating thermostatic elements have been described as normally lying in the same cylindrical surface and adapted to move into different cylindrical surfaces when differentially heated, it is obvious the elements might lie in the same cylindrical surface at a predetermined differential of heat and be adapted to move into different surfaces upon variations therefrom.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a thermostatic control device, a thermostatic responsive structure comprising coextending spaced apart portions in side by side relation and capable of lying in the same cylindrical surface, means joining one adjacent end of each of said portions together, means rigidly supporting the other end of one of said portions, the other end of said other portion being free to move relative to the supporting means in response to unequal heating of said two spaced apart portions, and carrying electrical contact means thereon.

2. In a thermostatic control device, a thermostatic responsive structure having coextending spaced apart portions in side by side relation and capable of lying in the same cylindrical surface, means joining one adjacent end of each of said portions together, means rigidly supporting the other end of one of said portions, an electrical contact carried by the free end of the other of said portions, and heating means for moving one of said portions with respect to the other.

3. In a thermostatic control device, a compensated thermostatic motor element, comprising securing means, two coextending thermostatic portions secured together in side by side relation by said securing means, said portions normally lying in the same cylindrical surface and in position to operate in unison, means for heating one of said portions independently of the other, a support for the unsecured end of one of said thermostatic portions, and electric contact means carried by the unsecured end of said second thermostatic portion movable in response to said heating means independently of ambient temperatures.

4. In a thermostatic control device, a compensated thermostatic motor element, comprising securing means, two coextending thermostatic composite metal members of similar thermo-responsive action, secured together by said securing means in side by side parallel relationship, means for heating one of said members, whereby the unsecured end of said other thermostatic member is movable out of parallel with respect to said first member in response to said heating means independently of ambient temperatures and electric contact means carried by said other thermostatic member.

5. In a thermostatic control device, a plurality of thermal responsive, coextending spaced apart members in side by side relation and normally lying in the same cylindrical surface, means commonly joining one of the ends of each of said members, means rigidly supporting the other end of one of said members, the other end of said other member carrying an electrical contact and being free to move relative to said supporting means whereat the said members describe a plurality of cylindrical surfaces.

6. In a thermostatic control device, a compensated thermostatic motor element, comprising a thermostatic composite metal plate, the development of said plate having a U-shaped outline, means for heating one of the legs of the U whereby the two adjacent ends of said legs are relatively movable in response to said heating means independently of ambient temperatures and an electric contact carried by one of the legs.

7. In a thermostatic control device, a compensated thermostatic motor element, comprising a support, a thermostatic composite metal plate, the development of said plate having a U-shaped outline, means for supporting one end of the U, means for heating one of the legs of said U, whereby the unsupported end is movable in response to said heating means independently of ambient temperatures.

8. In a thermostatic control device, a compensated thermostatic motor element bent in the form of a U and having a plurality of coextending composite metal portions of similar thermoresponsive action in side by side relation, a connection between adjacent ends of said portions lying in a surface common to both of said portions, and means for heating one of said portions.

9. In a thermostatic control device, a compensated thermostatic motor element, comprising securing means, two coextending thermostatic portions of similar thermo-responsive action secured together by said securing means in a common surface and in position to operate in unison, means for heating one of said portions responsively to the circuit to be controlled, a support for the unsecured end of one of said thermostatic portions whereby the unsecured end of said second thermostatic portion is movable in response to conditions in said circuit independently of ambient temperatures, and a heat insulating member interposed between said thermostatic portions, whereby said unheated portion is not affected by the heat of said heated portion.

10. A thermostatic control device, comprising a thermostatic composite metal plate having a plurality of slits alternately extending from the opposite ends to define strips, the outer strips being of less width than the inner strips to compensate for heat losses and to maintain a uniform temperature throughout the metal and means maintaining one set of adjacent ends in a common surface.

11. In a thermostatic control device, a thermostatic responsive structure having coextending spaced apart portions capable of lying in a common surface, means joining one adjacent end of each of said portions together and means rigidly supporting the other end of one of said portions, the other end of said other portion being free to move relative to the supporting means, one of said portions being an electrical resistance grid and adapted to be heated by passing electrical current therethrough.

12. A thermostatic control element, comprising a thermostatic composite metal plate having a series of slits alternately extending to opposite edges to define a series of strips, two of said strips being relatively narrow and wider strips intermediate said narrow strips.

13. A thermostatic control element comprising a thermostatic composite metal plate lying in a vertical plane, and having a series of parallel horizontal slits alternately extending from opposite ends to provide a series of strips increasing in width from the bottom to the top, and the uppermost strip being narrower than the strip below.

14. In a thermostatic control device, a thermostatic composite structure comprising a grid portion having a series of horizontal graduated strips increasing in width from the bottom to the top and the uppermost strip being narrower than the strip below and a compensating portion below said grid portion having a free end, means for joining the ends of said strips adjacent one side edge of said structure in a common surface, a support for said means, and a vertical member for joining the ends of said strips adjacent the other side edge of said structure in a common surface and for supporting that end of said compensating portion opposite said free end.

15. In a thermostatic control device, a compensated thermostatic motor element, comprising a thermostatic composite metal plate having a plurality of horizontally coextending portions in edge to edge relation, one of said portions being in the form of a grid resistor having a series of parallel horizontal slits alternately extending from opposite ends to provide a plurality of strips, said strips increasing in width from the bottom to the top, and the uppermost strip being narrower than the strip below; insulating means for securing the ends of said grid together, said grid being heated by current associated with the circuit to be controlled, and means for rigidly supporting one end of one of said portions.

16. In a thermostatic control device, a thermal responsive structure comprising coextending, spaced apart portions in side by side relation always lying in the same cylindrical surface when their temperatures are equal, means joining the two said portions together, electrical contact means carried by one of said elements, and means for differentially heating said portions and thereby moving said portions into different cylindrical surfaces.

17. In a thermostatic control device, a thermal responsive structure comprising two bimetallic, coextending, spaced apart elements in side by side relation having thermal responsive actions equal in amount and directions, said portions capable of lying in the same cylindrical space curve, means joining the said elements together at adjacent ends thereof, electric contact means carried by the other end of one of said elements, and means for differentially heating said elements and thereby moving said elements into different cylindrical space curves.

18. In a thermostatic control device a thermostatic responsive structure comprising a pair of coextending bimetallic thermostatic elements, said thermostatic elements normally lying in side by side parallel relation and capable of lying in a variety of different surfaces upon differential heating thereof, and a connection between a portion of each of said thermostatic elements always maintaining said connected portions in a common surface.

19. In a thermostatic control device a thermostatic responsive structure comprising a pair of coextending bimetallic thermostatic elements, said thermostatic elements normally lying in side by side parallel relation and capable of lying in a variety of different surfaces upon differential heating thereof, and a connection between said thermostatic elements always lying in common portions of the different surfaces described by said elements.

WILLIAM B. ELMER.